United States Patent
Hoshi

(10) Patent No.: US 12,500,753 B2
(45) Date of Patent: Dec. 16, 2025

(54) ELECTRONIC CONTROL UNIT AND STORAGE MEDIUM

(71) Applicant: TOYOTA JIDOSHA KABUSHIKI KAISHA, Toyota (JP)

(72) Inventor: Kazuma Hoshi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/624,739

(22) Filed: Apr. 2, 2024

(65) Prior Publication Data

US 2024/0348438 A1 Oct. 17, 2024

(30) Foreign Application Priority Data

Apr. 17, 2023 (JP) .................... 2023-067154

(51) Int. Cl.
*H04L 9/08* (2006.01)

(52) U.S. Cl.
CPC .................... *H04L 9/088* (2013.01)

(58) Field of Classification Search
CPC ... H04L 9/088; H04L 2209/84; H04L 9/0891; H04L 9/3242
See application file for complete search history.

(56) References Cited

U.S. PATENT DOCUMENTS

| | | | | |
|---|---|---|---|---|
| 7,003,110 B1* | 2/2006 | Jakobsson | ............. | H04L 9/0891 726/26 |
| 9,734,095 B2* | 8/2017 | Chinnakkonda Vidyapoornachary | ...................... | G06F 3/0673 |
| 9,760,504 B2* | 9/2017 | Chinnakkonda Vidyapoornachary | ...................... | G06F 3/0622 |
| 2017/0060780 A1* | 3/2017 | Chinnakkonda Vidyapoornachary | ...................... | G06F 3/0673 |
| 2017/0060782 A1* | 3/2017 | Chinnakkonda Vidyapoornachary | ...................... | G06F 3/0673 |
| 2018/0212977 A1* | 7/2018 | Gangi | .................. | H04L 63/123 |

FOREIGN PATENT DOCUMENTS

JP 2018-121220 A 8/2018

* cited by examiner

*Primary Examiner* — J. Brant Murphy
(74) *Attorney, Agent, or Firm* — Oliff PLC

(57) ABSTRACT

An electronic control unit is configured to communicate with a different electronic control unit via an in-vehicle network. The electronic control unit includes processing circuitry. The processing circuitry is configured to count a failure count, the failure count indicating a number of times of failure in updating a cryptographic key for performing message authentication with the different electronic control unit, disable an update function of the cryptographic key when the failure count exceeds an upper limit of the failure count, and enable the update function when, in a state in which the update function is disabled, power supply from a power source of the vehicle to the electronic control unit is stopped, and thereafter, power supply from the power source to the electronic control unit is started.

5 Claims, 5 Drawing Sheets

ELECTRONIC CONTROL UNIT AND STORAGE MEDIUM

BACKGROUND

1. Field

The present disclosure relates to an electronic control unit mounted on a vehicle and a storage medium.

2. Description of Related Art

Japanese Laid-Open Patent Publication No. 2018-121220 discloses an in-vehicle network system including one first node and multiple second nodes. In this system, the first node transmits, to the second nodes, a cryptographic key for performing message authentication between nodes in an encrypted state. Furthermore, the first node transmits verification data to multiple nodes to verify whether the encrypted cryptographic key has been correctly decrypted.

The second nodes each execute a process for decrypting the cryptographic key received from the first node. Upon receiving the verification data, the second node verifies whether the decryption of the cryptographic key has succeeded or failed based on data of the decrypted cryptographic key and the verification data. If the decryption of the cryptographic key has succeeded, the second node stores the cryptographic key to update the cryptographic key.

Unauthorized updating of the cryptographic key may be attempted by hacking from the outside. In such hacking attempts, the failure to update the cryptographic key may be repeated multiple times until the decryption of the cryptographic key is successful. Methods for preventing a cryptographic key from being improperly updated through hacking include a method of setting an upper limit on a failure count, which is number of failures in updating the cryptographic key. According to this method, if the failure count exceeds the upper limit, an update function of a cryptographic key in the second nodes can be disabled. In this case, since it is necessary to replace the second nodes in order to update the cryptographic key, unauthorized update of the cryptographic key by hacking is prevented.

When a communication failure or a procedure error occurs between nodes, decryption of a cryptographic key may fail. If the upper limit is set for the failure count as described above, there is a possibility that the failure count exceeds the upper limit due to many failures in decryption of the cryptographic key caused by a communication failure or a procedure error. In this case, the second nodes need to be replaced in order to update the cryptographic key even though there has been no attempt to update the cryptographic key by hacking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic control unit is configured to be mounted on a vehicle and configured to communicate with a different electronic control unit via an in-vehicle network. The electronic control unit includes processing circuitry. The processing circuitry is configured to count a failure count, the failure count indicating a number of times of failure in updating a cryptographic key for performing message authentication with the different electronic control unit, disable an update function of the cryptographic key when the failure count exceeds an upper limit of the failure count, and enable the update function when, in a state in which the update function is disabled, power supply from a power source of the vehicle to the electronic control unit is stopped, and thereafter, power supply from the power source to the electronic control unit is started.

In another general aspect, a non-transitory computer readable storage medium stores a program for updating a cryptographic key. The program includes instructions to be executed by an on-vehicle electronic control unit. The electronic control unit is configured to communicate with a different electronic control unit via an in-vehicle network. The instructions cause the electronic control unit to count a failure count, the failure count indicating a number of times of failure in updating a cryptographic key for performing message authentication with the different electronic control unit, disable an update function of the cryptographic key when the failure count exceeds an upper limit of the failure count, and enable the update function when, in a state in which the update function is disabled, power supply from a power source of the vehicle to the electronic control unit is stopped, and thereafter, power supply from the power source to the electronic control unit is started.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an electronic control unit (ECU) and a non-transitory computer readable storage medium according to an embodiment of the present disclosure will be described with reference to FIGS. 1 to 5. The "cryptographic key" as used in the present description is a key for performing message authentication between multiple ECUs.

Figure 1:
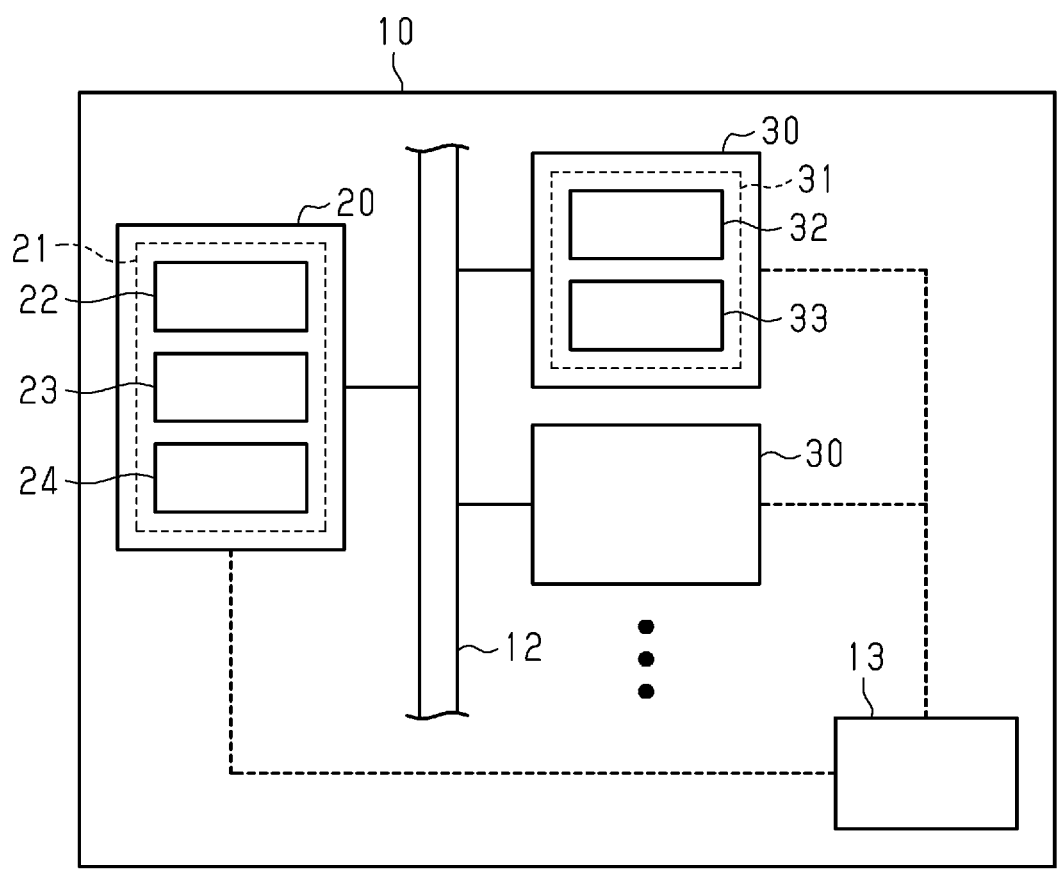
FIG. 1 is a schematic diagram showing a vehicle equipped with an electronic control unit according to an embodiment.

As shown in FIG. 1, the vehicle 10 includes a power source 13 and multiple ECUs. The multiple ECUs correspond to the ECUs mounted on the vehicle 10. The ECU operates by being supplied with power from the power source 13. On the other hand, when the power supply from the power source 13 is stopped, the operation of the ECU is stopped. The multiple ECUs include a master ECU 20 and multiple slave ECUs 30.

The master ECU 20 can communicate with multiple slave ECUs 30 via the in-vehicle network 12. An example of the in-vehicle network 12 is a controller area network (CAN).

The master ECU 20 comprises processing circuitry 21. For example, the processing circuitry 21 includes a central processing unit (CPU) 22, a first storage 23, and a second storage 24. For example, the first storage 23 is a nonvolatile memory, and the second storage 24 is a volatile memory. The first storage 23 stores various types of software including instructions executed by the CPU 22. The first storage 23 constitutes a non-transitory computer-readable storage medium. Data transmitted and received via the in-vehicle network 12 is encrypted. Therefore, when the processing circuitry 21 of the master ECU 20 receives data from the slave ECU 30 via the in-vehicle network 12, the processing circuitry 21 decrypts the data by using a cryptographic key stored in the processing circuitry 21.

Each of the multiple slave ECUs 30 includes processing circuitry 31. For example, processing circuitry 31 includes a CPU32 and storage 33. The storage 33 is a nonvolatile memory. The storage 33 stores various types of software including instructions executed by the CPU32. As described above, the data transmitted and received via the in-vehicle network 12 is encrypted. Therefore, when the processing circuitry 31 of the slave ECU 30 receives data from another ECU via the in-vehicle network 12, the processing circuitry 31 decrypts the data by using a cryptographic key stored in the processing circuitry 31.

Figure 2:
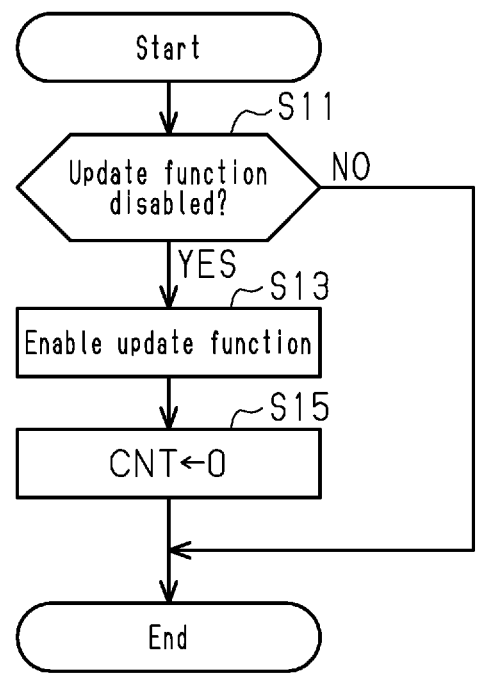
FIG. 2 is a flowchart illustrating a series of processes executed by a master ECU and a slave ECU, which are examples of the electronic control unit shown in FIG. 1.

A series of processes executed when power supply to the ECU is started;

A series of processes executed in both the master ECU 20 and the slave ECU 30 when power supply from the power source 13 is started will be described with reference to FIG. 2. In the master ECU 20, the CPU 22 executes the software of the first storage 23 so that the processing circuitry 21 executes a series of processes. In the slave ECU 30, the CPU32 executes the software of the storage 33 so that the processing circuitry 31 executes a series of processes.

In step S11, the processing circuitry 21, 31 determines whether its own cryptographic key update function is disabled. When the update function is disabled (S11: YES), the processing circuitry 21 or 31 shifts the processing to step S13. When the update function is enabled (S11: NO), the processing circuitry 21 or 31 ends the series of processing.

At step S13, the processing circuitry 21, 31 enables its update function. That is, the process of step S13 corresponds to a process of enabling the update function when, in a state in which the update function is disabled, power supply from the power source 13 to the ECU is stopped, and thereafter, power supply from the power source 13 to the ECU is started. In the next step S15, the processing circuitry 21, 31 resets the failure count CNT managed by itself to 0 (zero). Although details will be described later, the failure count CNT is the number of times the decryption of the cryptographic key has failed. Thereafter, the processing circuitry 21, 31 terminates the series of processing.

A series of processes executed by the master ECU

Figure 3:
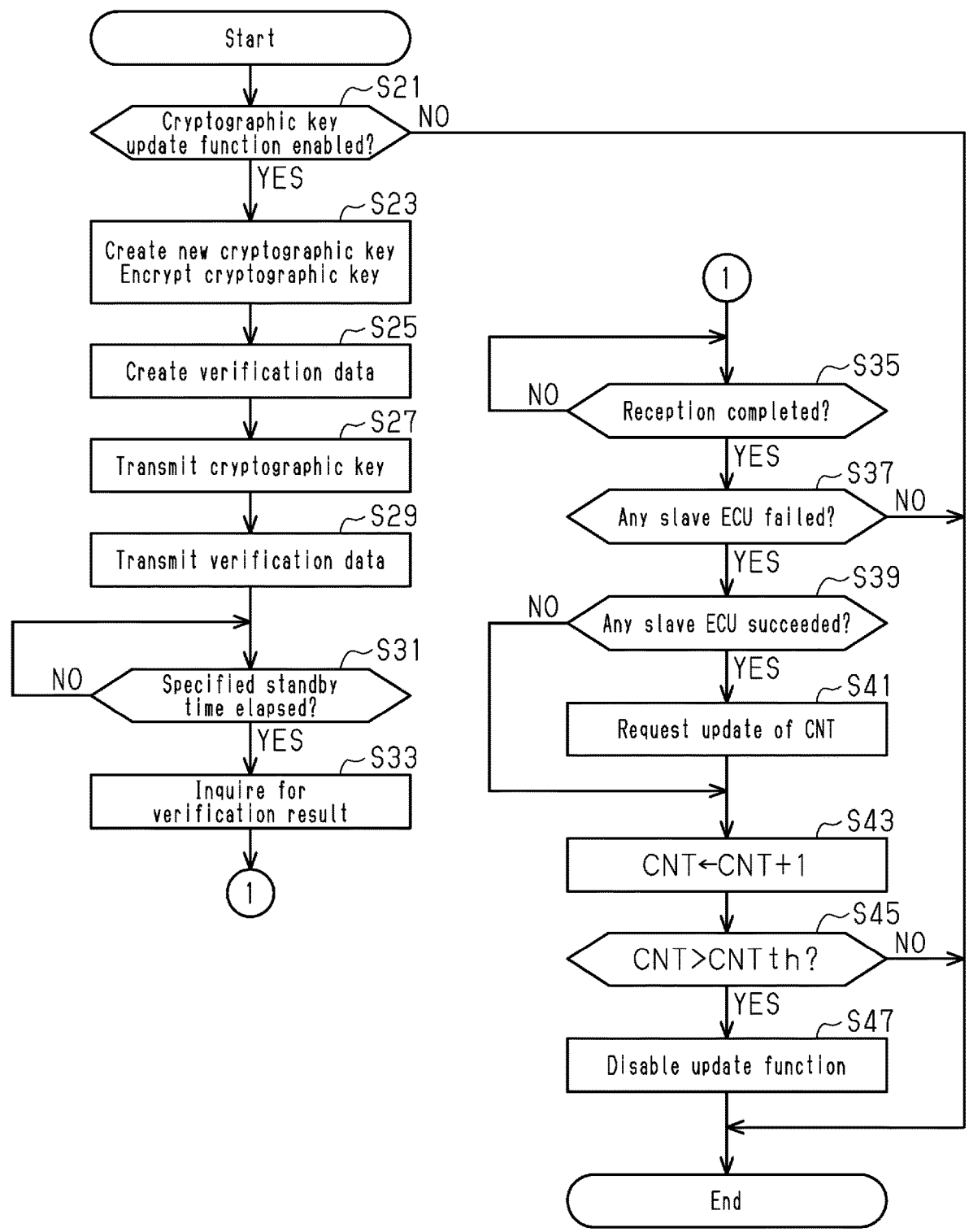
FIG. 3 is a flowchart illustrating a series of processes executed by the master ECU, which is an example of the electronic control unit shown in FIG. 1.

With reference to FIG. 3, a description will be given of a series of processing executed by the master ECU 20 when update of a cryptographic key is requested. That is, the CPU 22 executes the software of the first storage 23 so that the processing circuitry 21 executes a series of processes.

In step S21, the processing circuitry 21 determines whether its own cryptographic key update function is enabled. When the update function is enabled (S21: YES), the processing circuitry 21 shifts the processing to step S23. On the other hand, when the update function is disabled (S21: NO), the processing circuitry 21 ends the series of processes.

In step S23, the processing circuitry 21 creates a new cryptographic key and encrypts the cryptographic key. The processing circuitry 21 then stores the new cryptographic key. In the next step S25, the processing circuitry 21 generates a verification data. The verification data is used to verify whether decryption of the cryptographic key has succeeded or failed in the slave ECU 30.

In the following step S27, the processing circuitry 21 transmits the encrypted cryptographic key to the multiple slave ECUs 30. In a next step S29, the processing circuitry 21 transmits the verification data to the multiple slaves ECU 30. In subsequent step S31, the processing circuitry 21 determines whether the elapsed time from the time point of the verification-data transmission has reached a predetermined standby time. When the elapsed time reaches the waiting time, it is considered that the decryption of the cryptographic key and the verification of whether the decryption of the cryptographic key is successful in the slave ECU 30 are completed. Therefore, when the elapsed time does not reach the standby time (S31: NO), the processing circuitry 21 repeats the determination of step S31 until the elapsed time reaches the standby time. On the other hand, when the elapsed time has reached the standby time (S31: YES), the processing circuitry 21 shifts the processing to step S33.

In step S33, the processing circuitry 21 inquires of the multiple slave ECUs 30 about the verification result. In the subsequent step S35, the processing circuitry 21 determines whether information regarding the verification results of the multiple slave ECUs 30 has been received. When the processing circuitry 21 has not received the information on the verification result from at least one of the multiple slave ECUs 30 (S35: NO), the processing circuitry 21 repeats the determination of step S35. On the other hand, when the information regarding the verification result has been received from the multiple slave ECUs 30 (S35: YES), the processing circuitry 21 shifts the processing to step S37.

In step S37, the processing circuitry 21 determines whether the slave ECUs 30 include a slave ECU 30 that has failed to decrypt the cryptographic key. The slave ECU 30 that has failed to decrypt the cryptographic key corresponds to a "device that has failed to update the cryptographic key." When there is a slave ECU 30 for which decryption has failed (S37: YES), the processing circuitry 21 shifts the processing to step S39. On the other hand, when there is no slave ECU 30 for which decryption has failed (S37: NO), the processing circuitry 21 ends the series of processing.

In step S39, the processing circuitry 21 determines whether the slave ECUs 30 include a slave ECU 30 that has succeeded in decrypting the cryptographic key. The slave ECU 30 that has succeeded in decrypting the cryptographic key corresponds to a "device that has succeeded in updating the cryptographic key." When there is a slave ECU 30 for which decryption has succeeded (S39: YES), the processing circuitry 21 shifts the processing to step S41. On the other hand, when there is no slave ECU 30 for which decryption has succeeded (S39: NO), the processing circuitry 21 shifts the processing to step S43.

In step S41, the processing circuitry 21 requests the slave ECU 30 that has successfully decrypted the cryptographic key to update the failure count CNT. Then, the processing circuitry 21 shifts the processing to step S43.

In step S43, the processing circuitry 21 updates the failure count CNT so that the failure count CNT managed by the processing circuitry 21 increases by 1. That is, the process of step S43 corresponds to a process of counting the failure count CNT, which is the number of failures in updating the cryptographic key.

In the subsequent step S45, the processing circuitry 21 determines whether the failure count CNT managed by the processing circuitry 21 exceeds the count determination value CNTth. The count determination value CNTth is an upper limit of the failure count CNT. For example, an integer of 2 or more is set as the count determination value CNTth. When the failure count CNT exceeds the count determination value CNTth (S45: YES), the processing circuitry 21 shifts the processing to step S47. On the other hand, when the failure count CNT is equal to or less than the count determination value CNTth (S45: NO), the processing circuitry 21 ends the series of processes.

In step S47, the processing circuitry 21 disables its own cryptographic key update function. That is, the process of step S47 corresponds to a process of disabling the cryptographic key update function when the failure count CNT exceeds the upper limit of the failure count CNT. Thereafter, the processing circuitry 21 ends a series of processing.

Series of Processes Executed by Slave ECU

Figure 4:
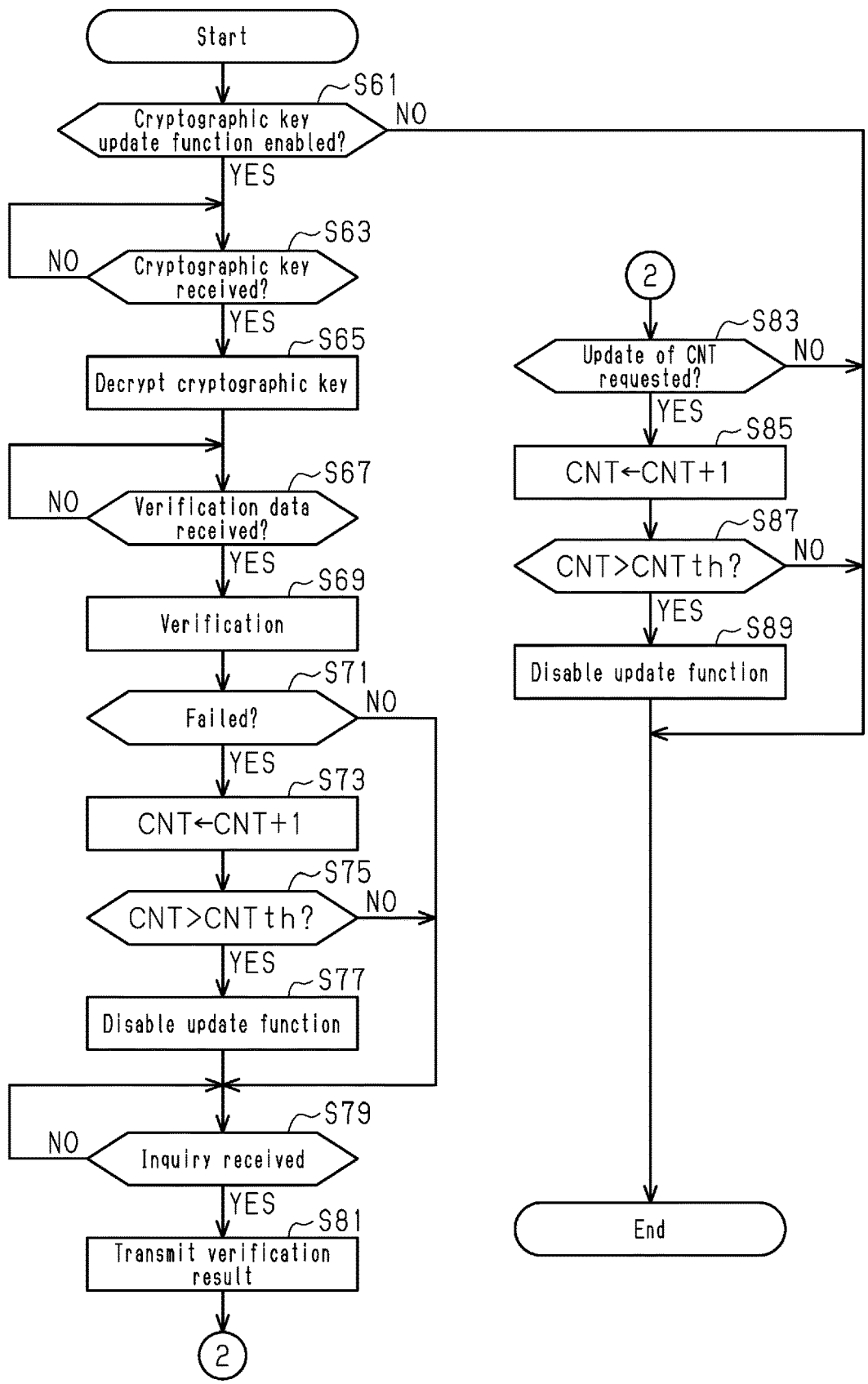
FIG. 4 is a flowchart illustrating a series of processes executed by the slave ECU, which is an example of the electronic control unit shown in FIG. 1.

With reference to FIG. 4, a description will be given of a series of processing executed in the slave ECU 30 when update of the cryptographic key is requested. In the slave ECU 30, the CPU 32 executes the software of the storage 33 so that the processing circuitry 31 executes a series of processes.

In step S61, the processing circuitry 31 determines whether its own cryptographic key update function is enabled. When the update function is enabled (S61: YES), the processing circuitry 31 shifts the processing to step S63. On the other hand, when the update function is disabled (S61: NO), the processing circuitry 31 ends the series of processes.

In step S63, the processing circuitry 31 determines whether a new cryptographic key in an encrypted state has been received from the master ECU 20. When a new cryptographic key is received (S63: YES), the processing circuitry 31 shifts the processing to step S65. On the other hand, if a new cryptographic key has not been received (S63: NO), the processing circuitry 31 repeats the determination of step S63.

In step S65, the processing circuitry 31 decrypts the new cryptographic key in the encrypted state. At this time, the processing circuitry 31 decrypts the new cryptographic key using the pre-update cryptographic key. In the following step S67, the processing circuitry 31 determines whether the verification data has been received from the master ECU 20. When the processing circuitry 31 has received the verification data (S67: YES), the processing circuitry 31 shifts the processing to step S69. On the other hand, when the processing circuitry 31 has not received the verification data (S67: NO), the processing circuitry 31 repeats the determination of step S67.

In step S69, the processing circuitry 31 verifies whether the decryption of the new cryptographic key has succeeded. In the following step S71, the processing circuitry 31 determines whether the decryption of the cryptographic key has failed based on the result of the verification. When the decryption has failed (S71: YES), the processing circuitry 31 shifts the processing to step S73. On the other hand, when the decryption is successful (S71: NO), the processing circuitry 31 shifts the processing to step S79.

In step S73, the processing circuitry 21 updates the failure count CNT so that the failure count CNT managed by the processing circuitry 21 increases by 1. In the subsequent step S75, the processing circuitry 31 determines whether the failure count CNT exceeds a count determination value CNTth. When the failure count CNT exceeds the count determination value CNTth (S75: YES), the processing circuitry 31 shifts the processing to step S77. On the other hand, when the failure count CNT is equal to or less than the count determination value CNTth (S75: NO), the processing circuitry 31 shifts the processing to step S79.

In step S77, the processing circuitry 31 disables the update function. The process of step S77 corresponds to a process of disabling the cryptographic key update function when the failure count CNT exceeds the upper limit of the failure count CNT. Then, the processing circuitry 31 shifts the processing to step S79.

In step S79, the processing circuitry 31 determines whether a query for the verification result has been received from the master ECU 20. When the processing circuitry 31 has received the query (S79: YES), the processing circuitry 31 shifts the processing to step S81. On the other hand, when the processing circuitry 31 has not received the query (S79: NO), the processing circuitry 31 repeats the determination of step S79.

In step S81, the processing circuitry 31 sends information about the verification result to the master ECU 20. In the following step S83, the processing circuitry 31 determines whether a request to update the failure count CNT has been received from the master ECU 20. When the processing circuitry 31 has received the request (S83: YES), the processing circuitry 31 shifts the processing to step S85. On the other hand, when the processing circuitry 31 has not received the request (S83: NO), the processing circuitry 31 ends the series of processes.

In step S85, the processing circuitry 31 updates the failure count CNT in the same manner as in step S73. That is, the process of step S85 corresponds to a process of counting the failure count CNT, which is the number of failures in updating the cryptographic key. In the next step S87, the processing circuitry 31 determines whether the failure count CNT exceeds a count determination value CNTth. When the failure count CNT exceeds the count determination value CNTth (S87: YES), the processing circuitry 31 shifts the processing to step S89. On the other hand, when the failure count CNT is equal to or less than the count determination value CNTth (S87: NO), the processing circuitry 31 ends the series of processes.

In step S89, the processing circuitry 31 disables the update function. The process of step S89 corresponds to a process of disabling the cryptographic key update function when the failure count CNT exceeds the upper limit of the failure count CNT. Thereafter, the processing circuitry 31 ends the series of processing.

Operation and Advantages of Present Embodiment

Figure 5:
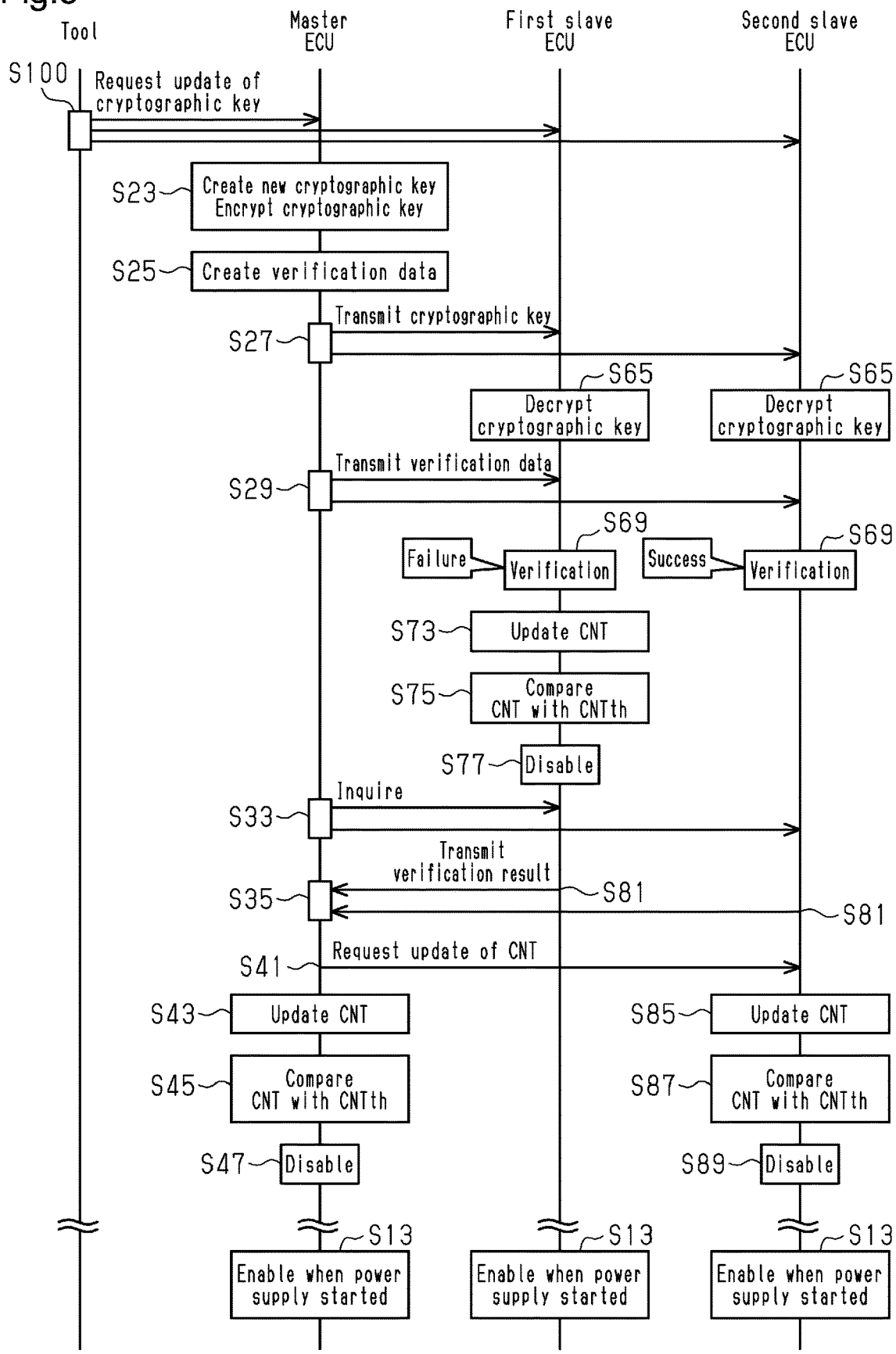
FIG. 5 is a sequence diagram illustrating an example of a flow of processes in a case in which update of a cryptographic key fails.

Referring to FIG. 5, the operation of updating the cryptographic key will be described. Here, for convenience of explanation, it is assumed that the control system includes a first slave ECU 30A and a second slave ECU 30B as the slave ECU 30.

A tool is communicatively coupled to the control system. Then, the tool requests the master ECU 20 and the multiple slave ECUs 30 to update the cryptographic key (S100). Then, in the master ECU 20, a new cryptographic key is created and the cryptographic key is encrypted (S23). Subsequently, verification data is generated (S25). Then, the master ECU 20 transmits the new cryptographic key to the multiple slave ECUs 30 (S27). Thereafter, the master ECU 20 transmits the verification data to the multiple slave ECUs 30 (S29).

Upon receipt of the new cryptographic key, each slave ECU 30 decrypts the cryptographic key (S65). Further, when the verification data is received, it is verified whether the decryption of the cryptographic key has succeeded or failed (S69). In the example illustrated in FIG. 5, while the decryption of the cryptographic key fails in the first slave ECU 30A, the decryption of the cryptographic key succeeds in the second slave ECU 30B.

Therefore, in the first slave ECU 30A, the failure count CNT is updated (S73). As a result of the comparison between the failure count CNT and the count determination value CNTth, if the failure count CNT exceeds the count determination value CNTth (S75: YES), the cryptographic key update function of the first slave ECU 30A is disabled (S77).

The master ECU 20 transmits a verification result query to multiple slave ECUs 30 (S33). Then, the first slave ECU 30A transmits the fact that the decryption of the cryptographic key has failed to the master ECU 20 as information on the verification result (S81). On the other hand, the second slave ECU 30B transmits the fact that the decryption of the cryptographic key is successful to the master ECU 20 as information on the verification result (S81). When the master ECU 20 receives the information on the verification result from the multiple slave ECUs 30 (S35: YES), the master ECU 20 transmits the update of the failure count CNT to the second slave ECU 30B (S41).

Then, in the master ECU 20 and the second slave ECU 30B, the failure count CNT is updated (S43, S85). Then, as a result of the comparison between the failure count CNT and the count determination value CNTth, if the failure count CNT exceeds the count determination value CNTth (S45: YES/S87: YES), the cryptographic key update function is disabled (S47, S89).

Power supply from the power source 13 to the master ECU 20 and the multiple slave ECUs 30 is stopped. Thereafter, power supply from the power source 13 to the master ECU 20 and the multiple slave ECUs 30 is started. Then, the cryptographic key update function is enabled in each of the master ECU 20 and the multiple slave ECUs 30 (S13). Further, the failure count CNT is reset to 0 (zero).

In the present embodiment, the following effects can be obtained.

(1) In any of the master ECU 20 and the multiple slave ECUs 30, when the failure count CNT exceeds the count determination value CNTth, the cryptographic key update function is disabled. This prevents the cryptographic key from being illegally updated by hacking from the outside. When, in a state in which the update function is disabled, the power supply to the master ECU 20 and the multiple slave ECUs 30 is stopped, and thereafter, the power supply to the master ECU 20 and the multiple slave ECUs 30 is started, the update function is enabled again in the master ECU 20 and the multiple slave ECUs 30. When the update function is enabled in this way, the cryptographic key can be updated. That is, it is not necessary to exchange the master ECU 20 and the multiple slave ECUs 30 in order to update the cryptographic key. Therefore, in the master ECU 20 and the multiple slave ECUs 30, it is possible to suppress an increase in the number of times of replacement of the ECU while suppressing a decrease in security.

(2) In the master ECU 20 and the multiple slave ECUs 30, when, in a state in which the update function is disabled, the power supply to the master ECU 20 and the multiple slave ECUs 30 is stopped, and thereafter, the power supply to the master ECU 20 and the multiple slave ECUs 30 is started, the failure count CNT is reset to 0 (zero). Accordingly, in the master ECU 20 and the multiple slave ECUs 30, it is possible to prevent the update function from being disabled again due to a single failure in decryption of the cryptographic key.

(3) When decryption of the cryptographic key fails in only a part of the multiple slave ECUs 30, the failure count CNT is updated also in the slave ECU 30 and the master ECU 20 in which decryption of the cryptographic key succeeds. Thus, the master ECU 20 and the multiple slave ECUs 30 can disable the update function by their own determination.

Modifications

The above-described embodiment may be modified as follows. The above-described embodiment and the following modifications can be combined as long as the combined modifications remain technically consistent with each other.

When the update of the cryptographic key fails in some of the multiple slave ECUs 30, the processing circuitry 21 of the master ECU 20 may not request the slave ECU 30 that has succeeded in the update of the cryptographic key to update the failure count CNT. In this case, when the failure count CNT managed by the processing circuitry 21 exceeds the count determination value CNTth, the processing circuitry 21 may not only disable the update function of the processing circuitry 21 itself but also instruct the slave ECU 30 to disable the update function.

The processing circuitry 21 of the master ECU 20 may not update the failure count CNT managed by the processing circuitry 21 itself when the update of the cryptographic key fails in at least one of the multiple slave ECUs 30. In this case, when the update function is disabled in at least one of the multiple slave ECUs 30, the processing circuitry 21 of the master ECU 20 may disable its own update function when the processing circuitry 21 acquires information indicating that there is a slave ECU 30 whose update function is disabled.

When the power supply to the master ECU 20 and the multiple slave ECUs 30 is stopped in a state in which the update function is disabled and then the power supply to the master ECU 20 and the multiple slave ECUs 30 is started, the processing circuitry 21 or 31 may not reset the failure count CNT to 0 (zero).

An ECU that transmits and receives data to and from a data center installed outside the vehicle may function as the master ECU.

The processing circuitry 21, 31 is not limited to a device that includes a CPU and a ROM and executes software processing. That is, the processing circuitry 21, 31 may be modified as long as it has any one of the following configurations (a) to (c).

(a) The processing circuitry 21, 31 includes one or more processors that execute various processes according to computer programs. The processor includes a CPU and a memory such as RAM and ROM. The memory stores program code or instructions configured to cause the CPU to perform operations. The memory, which is a computer-readable medium, includes any type of media that are accessible by general-purpose computers and dedicated computers.

(b) The processing circuitry 21, 31 includes one or more dedicated hardware circuits that execute various processes. The dedicated hardware circuits include, for example, an application specific integrated circuit (ASIC) and a field programmable gate array (FPGA).

(c) The processing circuitry 21, 31 includes a processor that executes part of various processes according to programs and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electronic control unit configured to be mounted on a vehicle and configured to communicate with a different electronic control unit via an in-vehicle network, the electronic control unit comprising processing circuitry,
wherein the processing circuitry is configured to
count a failure count, the failure count indicating a number of times of failure in updating a cryptographic key for performing message authentication with the different electronic control unit;
disable an update function of the cryptographic key when the failure count exceeds an upper limit of the failure count; and
enable the update function when, in a state in which the update function is disabled, power supply from a power source of the vehicle to the electronic control unit is stopped, and thereafter, power supply from the power source to the electronic control unit is started.

2. The electronic control unit according to claim 1, wherein the processing circuitry is configured to reset the failure count to zero when, in a state in which the update function is disabled, power supply from the power source to the electronic control unit is stopped, and thereafter, power supply from the power source to the electronic control unit is started.

3. The electronic control unit according to claim 1, wherein
the different electronic control unit is one of multiple different electronic control units, and
the processing circuitry is further configured to
instruct the different electronic control units to update the cryptographic key by transmitting data of the cryptographic key to the different electronic control units; and
update the failure count managed by the electronic control unit when the different electronic control units include a unit that has failed to update the cryptographic key.

4. The electronic control unit according to claim 3, wherein the processing circuitry is further configured to, when the different electronic control units include both a unit that has failed to update the cryptographic key and a unit that has succeeded in updating the cryptographic key, request the unit that has succeeded in updating the cryptographic key to update the failure count managed by the unit that has succeeded in updating the cryptographic key.

5. A non-transitory computer readable storage medium that stores a program for updating a cryptographic key, the program including instructions to be executed by an on-vehicle electronic control unit, wherein
the electronic control unit is configured to communicate with a different electronic control unit via an in-vehicle network, and
the instructions cause the electronic control unit to
count a failure count, the failure count indicating a number of times of failure in updating a cryptographic key for performing message authentication with the different electronic control unit;
disable an update function of the cryptographic key when the failure count exceeds an upper limit of the failure count; and
enable the update function when, in a state in which the update function is disabled, power supply from a power source of a vehicle to the electronic control unit is stopped, and thereafter, power supply from the power source to the electronic control unit is started.

* * * * *